(12) United States Patent
Li et al.

(10) Patent No.: US 12,083,533 B2
(45) Date of Patent: Sep. 10, 2024

(54) SEPARATING MECHANISM FOR MAGNETIC FOREIGN MATTER IN SINTERING SLURRY OF LITHIUM ION BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Aixia Li, Guangdong (CN); Haijun Yu, Guangdong (CN); Changdong Li, Guangdong (CN); Yinghao Xie, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/565,021

(22) PCT Filed: Jul. 15, 2022

(86) PCT No.: PCT/CN2022/106015
§ 371 (c)(1),
(2) Date: Nov. 28, 2023

(87) PCT Pub. No.: WO2023/240735
PCT Pub. Date: Dec. 21, 2023

(65) Prior Publication Data
US 2024/0261795 A1 Aug. 8, 2024

(30) Foreign Application Priority Data
Jun. 14, 2022 (CN) .......................... 202210666998.3

(51) Int. Cl.
*B03C 1/28* (2006.01)

(52) U.S. Cl.
CPC .......... *B03C 1/286* (2013.01); *B03C 2201/18* (2013.01); *B03C 2201/22* (2013.01)

(58) Field of Classification Search
CPC ............ B03C 1/03; B03C 1/031; B03C 1/286
(Continued)

(56) References Cited

FOREIGN PATENT DOCUMENTS

| CN | 203725252 | 7/2014 |
|---|---|---|
| CN | 207628574 | 7/2018 |

(Continued)

OTHER PUBLICATIONS

International Search Report and Written Opinion issued for the PCT application No. PCT/CN2022/106015 on Feb. 22, 2023 with English translation (9 pages).

*Primary Examiner* — Michael McCullough
*Assistant Examiner* — Molly K Devine
(74) *Attorney, Agent, or Firm* — Leason Ellis LLP

(57) ABSTRACT

Disclosed is a separating mechanism for a magnetic foreign matter in a sintering slurry of a lithium ion battery, including a separating machine body; the separating machine body includes an upper cover and a separating cylinder; the upper cover is provided with a driving motor at a top end; a stirring and separating mechanism is arranged in an inner cavity of the separating cylinder; the stirring and separating mechanism includes a planetary gear set, a stirring shaft, a collecting frame, a magnetic guide sleeve and a balancing ring; the planetary gear set includes a gear ring, planetary gears, a sun gear and a connecting plate; one end of the stirring shaft is connected with a central rotating shaft of the planetary gears; the collecting frame is connected with a
(Continued)

central rotating shaft of the sun gear; and the magnetic guide sleeve is spirally sleeved on an outer side of the stirring shaft.

20 Claims, 3 Drawing Sheets

(58) Field of Classification Search
USPC .......................................................... 209/39
See application file for complete search history.

(56) References Cited

FOREIGN PATENT DOCUMENTS

| | | |
|---|---|---|
| CN | 211971823 | 11/2020 |
| CN | 212790609 | 3/2021 |
| CN | 112921696 A | 6/2021 |
| JP | 2003144973 | 5/2003 |

SEPARATING MECHANISM FOR MAGNETIC FOREIGN MATTER IN SINTERING SLURRY OF LITHIUM ION BATTERY

CROSS-REFERENCE TO RELATED APPLICATION

This application is a national stage filing under 35U.S.C. § 371 of international application number PCT/CN2022/106015, filed on Jul. 15, 2022, which claims priority to Chinese patent application No. 202210666998.3 filed on Jun. 14, 2022. The contents of these applications are incorporated herein by reference in their entirety.

TECHNICAL FIELD

The present disclosure relates to the technical field of foreign matter separation from battery slurries, and more particularly, to a separating mechanism for a magnetic foreign matter in a sintering slurry of a lithium ion battery.

BACKGROUND

The stirring of a cell slurry of a lithium ion battery is one of the more important steps in a whole production process of the lithium ion battery, and a mixing degree of the stirring of the battery slurry and a removal efficiency of a magnetic foreign matter have great influences on a product quality of the lithium ion battery.

An electrode slurry of the lithium ion battery contains a cathode slurry and an anode slurry. During preparation of the cathode slurry and the anode slurry, the magnetic foreign matter in the mixed slurry often influences the quality of the finished lithium ion battery. Therefore, the magnetic foreign matter in the battery slurry is often separated by means of multiple cyclic permanent magnet adsorptions and multiple filtrations in the prior art, but this method has the problems of long adsorption time and low adsorption efficiency. Therefore, a mechanism capable of shortening a separating rate and improving a separating efficiency of the magnetic foreign matter is urgently needed to solve the above problems.

SUMMARY

The present disclosure aims to provide a separating mechanism for a magnetic foreign matter in a sintering slurry of a lithium ion battery, so as to solve the problems in the background above.

In order to achieve the objective above, the solutions in the present disclosure are as follows: a separating mechanism for a magnetic foreign matter in a sintering slurry of a lithium ion battery includes a separating machine body; the separating machine body includes an upper cover and a separating cylinder which are detachably connected; the separating cylinder is obliquely fixed through a bracket, and the separating cylinder is provided with a discharge port at a bottom end; the upper cover is provided with a driving motor a top end; a stirring and separating mechanism is arranged in an inner cavity of the separating cylinder; an output shaft of the driving motor extends into an inner cavity of the upper cover and is connected with the stirring and separating mechanism; the stirring and separating mechanism includes a planetary gear set, a stirring shaft, a collecting frame, a magnetic guide sleeve and a balancing ring; the planetary gear set includes a gear ring, planetary gears, a sun gear and a connecting plate; the gear ring is fixed in an inner wall on one side of the upper cover close to the separating cylinder; the sun gear is located at a central point of the gear ring, and a central rotating shaft of the sun gear is connected with the output shaft of the driving motor through a coupler; the planetary gears are arranged at equal intervals between the sun gear and the gear ring, and the planetary gears are all meshed with the sun gear and the gear ring; the connecting plate is rotatably arranged on an outer side of the central rotating shaft above the sun gear, the connecting plate is provided with a hole for a central rotating shaft of the planetary gear to pass through, and the connecting plate between two adjacent holes is provided with a connecting rod at a bottom portion; the balancing ring is fixed above the discharge port at a bottom portion of the inner cavity of the separating cylinder; one end of the stirring shaft is connected with a bottom portion of the central rotating shaft of the planetary gear through a coupler, the other end of the stirring shaft is contacted with an outer side wall of the balancing ring, and the stirring shaft is provided with multiple sets of stirring blades at equal intervals on an outer side wall; the collecting frame is located directly below the sun gear and detachably connected with a bottom portion of the central rotating shaft of the sun gear, the collecting frame and the stirring shaft are parallel to each other, and the collecting frame is provided with an annular opening on an outer side wall; the magnetic guide sleeve is spirally sleeved on an outer side of the stirring shaft, an upper end of an outer side wall of the magnetic guide sleeve is fixedly connected with the bottom portion of the adjacent connecting rod, and a top end of the magnetic guide sleeve extends to an inner side of the annular opening; and the multiple sets of stirring blades on the stirring shaft are all contacted with an inner wall of the magnetic guide sleeve on the outer side of the stirring shaft.

Further, the separating cylinder is provided with an observation window for observing the inner cavity of the separating cylinder.

Further, a number of the planetary gears is no less than three; and a number of the holes in the connecting plate, a number of the stirring shafts and a number of the magnetic guide sleeves are all equal to the number of the planetary gears.

Further, a size of the planetary gear is greater than or equal to that of the sun gear.

Further, the outer side wall of each of the stirring shafts includes at least three sets of stirring blades, and a number of blades of each set of stirring blades is no less than two.

Further, surfaces of the stirring blades are all provided with rubber sleeves.

Further, the collecting frame includes an upper plate and a lower cylinder which are detachably connected; a connecting column is fixed in a center of an opening of the lower cylinder through a supporting rod, and the connecting column extends upwardly along an arrangement direction of the lower cylinder; and a top end of the connecting column is in threaded connection with the upper plate, so that the annular opening is formed between a bottom portion of the upper plate and the opening of the lower cylinder.

Further, the upper plate is provided with, at a top end, a threaded groove movably connected with the central rotating shaft of the sun gear.

Further, the magnetic guide sleeve is provided with an electromagnet sheet on the inner wall, so that the magnetic guide sleeve is capable of generating a magnetic force on the inner wall after being electrified.

Further, the balancing ring is provided with balls at equal intervals on the outer side wall; and when the other end of the stirring shaft is contacted with the balancing ring, the stirring shaft is always contacted with the balls.

Compared with the prior art, the present disclosure has the beneficial effects as follows:

(1) according to the present disclosure, by using the stirring and separating mechanism in a special structure, when the driving motor drives the planetary gear set to be operated, the stirring shaft can be driven to revolve and rotate, the sintering slurry of the battery inside the separating cylinder is fully stirred, and the sintering slurry of the battery is continuously pushed to the magnetic guide sleeve through the stirring blades on the stirring shaft, so that the magnetic foreign matter doped in the sintering slurry of the battery is adsorbed on the inner wall of the magnetic guide sleeve, and with the continuous rotation of the stirring shaft, the stirring blades rub against the inner wall of the magnetic guide sleeve, and the adsorbed magnetic foreign matter is pushed to move upwardly along the inner wall of the magnetic guide sleeve, and finally enters the collecting frame for centralized collection, thus effectively realizing rapid separation of the magnetic foreign matter from other substances in the sintering slurry of the battery, shortening a separation time of the magnetic foreign matter, and improving a separation rate of the magnetic foreign matter;

(2) according to the present disclosure, by forming the planetary gear set with the gear ring, the planetary gear, the sun gear and the connecting plate, the stirring shaft can rotate during circumferential rotation around the gear ring under an influence of the planetary gear, which improves a stirring effect of the stirring shaft on the sintering slurry of the battery, and ensures that the magnetic foreign matter in the sintering slurry of the battery can be fully contacted with the magnetic guide sleeve, thus ensuring the separation rate of the magnetic foreign matter and shortening the separation time; and (3) according to the present disclosure, by using the magnetic guide sleeve in a special shape and arranging the magnetic guide sleeve on the outer side of the stirring shaft, the stirring blades may continuously rub against the inner wall of the magnetic guide sleeve during rotation of the stirring shaft, and then the magnetic foreign matter adsorbed on the inner wall of the magnetic guide sleeve is pushed to continuously move upwardly, so that the separated magnetic foreign matter may be directly pushed into the collecting frame for centralized collection, and the rest of the sintering slurry of the battery may be discharged through the discharge port, thus being beneficial for rapid separation of the magnetic foreign matter from other substances in the sintering slurry of the lithium ion battery.

Figure 1:
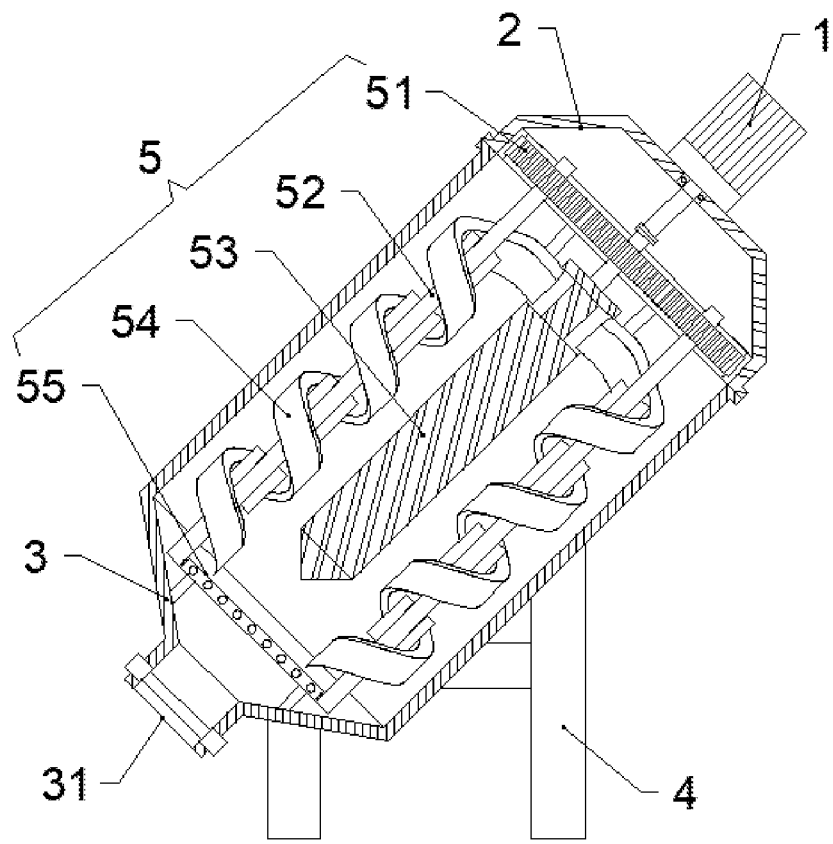
FIG. 1 is a schematic structural diagram of a front cross section of the present disclosure.

In the drawings, the members represented by the reference numerals are listed as follows:

1 refers to driving motor, 2 refers to upper cover, 3 refers to separating cylinder, 31 refers to observation window, 32 refers to discharge port, 4 refers to bracket, 5 refers to stirring and separating mechanism, 51 refers to planetary gear set, 511 refers to ring gear, 512 refers to planetary gears, 513 refers to sun gear, 514 refers to connecting plate, 515 refers to connecting rod, 52 refers to stirring shaft, 53 refers to collecting frame, 531 refers to upper plate, 532 refers to annular opening. 533 refers to connecting column, 534 refers to lower cylinder, 535 refers to supporting rod, 54 refers to magnetic guide sleeve, and 55 refers to balancing ring.

DETAILED DESCRIPTION OF EMBODIMENTS

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are intended to explain the present disclosure, but should not be construed as limiting the present disclosure.

Embodiment 1

As shown in FIG. 1 to FIG. 6, a separating mechanism for a magnetic foreign matter in a sintering slurry of a lithium ion battery includes a separating machine body. The separating machine body includes an upper cover 2 and a separating cylinder 3 which are detachably connected; and the separating cylinder 3 is obliquely fixed through a bracket 4, and the separating cylinder 3 is provided with a discharge port 32 at a bottom end. The upper cover 2 is provided with a driving motor 1 at a top end; a stirring and separating mechanism 5 is arranged in an inner cavity of the separating cylinder 3; and an output shaft of the driving motor 1 extends into an inner cavity of the upper cover 2 and is connected with the stirring and separating mechanism 5. The stirring and separating mechanism 5 includes a planetary gear set 51, a stirring shaft 52, a collecting frame 53, a magnetic guide sleeve 54 and a balancing ring 55. The planetary gear set 51 includes a gear ring 511, planetary gears 512, a sun gear 513 and a connecting plate 514. The gear ring 511 is fixed in an inner wall on one side of the upper cover 2 close to the separating cylinder 3; the sun gear 513 is located at a central point of the gear ring 511, and a central rotating shaft of the sun gear 513 is connected with the output shaft of the driving motor 1 through a coupler; the planetary gears 512 are arranged at equal intervals between the sun gear 513 and the gear ring 511, and the planetary gears 512 are all meshed with the sun gear 513 and the gear ring 511; and the connecting plate 514 is rotatably arranged on an outer side of the central rotating shaft above the sun gear 513, the connecting plate 514 is provided with a hole for a central rotating shaft of the planetary gear 512 to pass through, and the connecting plate 514 between two adjacent holes is provided with a connecting rod 515 at a bottom portion. The balancing ring 55 is fixed above the discharge port 32 at a bottom portion of the inner cavity of the separating cylinder 3. One end of the stirring shaft 52 is connected with a bottom portion of the central rotating shaft of the planetary gear 512 through a coupler, the other end of the stirring shaft 52 is contacted with an outer side wall of the balancing ring 55, and the stirring shaft 52 is provided with multiple sets of stirring blades at equal intervals on an outer side wall. The collecting frame 53 is located directly below the sun gear 513 and detachably connected with a bottom portion of the central rotating shaft of the sun gear 513, the collecting frame 53 and the stirring shaft 52 are parallel to each other, and the collecting frame 53 is provided with an annular opening 532 on an outer side wall. The magnetic guide sleeve 54 is spirally sleeved on an outer side of the stirring shaft 52, an upper end of an outer side wall of the magnetic guide sleeve 54 is fixedly connected with the bottom portion of the adjacent connecting rod 515, and a top end of the magnetic guide sleeve 54 extends to an inner side of the annular opening 532; and the multiple sets of stirring blades on the stirring shaft 52 are all contacted with an inner wall of the magnetic guide sleeve 54 on the outer side of the stirring shaft 52. In the embodiment, a number of the planetary gears 512 is no less than three; and a number of the holes in the connecting plate 514, a number of the stirring shafts 52 and a number of the magnetic guide sleeves 54 are all equal to the number of the planetary gears 512. In the embodiment, the magnetic guide sleeve 54 is provided with an electromagnet sheet on the inner wall, so that the magnetic guide sleeve 54 is capable of generating a magnetic force on the inner wall after being electrified. The number of the planetary gears 512 is preferably four. When the sintering slurry of the battery is injected into the separating cylinder 3 and the upper cover 2 is assembled with the separating cylinder 3, the stirring and separating mechanism 5 may be driven to move by the rotation of the driving motor 1, the output shaft of the rotating driving motor 1 may drive the sun gear 513 in the planetary gear set 51 to rotate, and the collecting frame 53 is driven to rotate by the sun gear 513, and meanwhile, the meshed planetary gears 512 circumferentially rotate along the inner wall of the gear ring 511. Therefore, the stirring shaft 52 can revolve around the sun gear 513 (which is namely circumferential rotation around the ring gear 511 with the central axis of the inner cavity of the separating cylinder 3 as a central line) and rotate under an influence of the planetary gear 512, so as to continuously stir the sintering slurry of the battery inside the separating cylinder 3. At the moment, the planetary gear 512 revolving around the sun gear 513 may push the connecting plate 514 to rotate, and the connecting rod 515 fixed on the bottom portion of the connecting plate 514 may push the magnetic guide sleeve 54 and the stirring shaft 52 to synchronously revolve around the sun gear 513 together (the magnetic guide sleeve 54 only revolves around the sun gear 513, but does not rotate), so that when the magnetic guide sleeve 54 is electrified, a magnetic attraction force may be generated at the inner side wall of the magnetic guide sleeve 54. Therefore, the multiple sets of stirring blades on the stirring shaft 52 rotating continuously may continuously push the sintering slurry of the battery to the magnetic guide sleeve 54, so that the magnetic foreign matter doped in the sintering slurry of the battery is adsorbed on the inner side wall of the spiral magnetic guide sleeve 54 under an influence of a magnetic force. Meanwhile, with the continuous rotation of the stirring shaft 52, the stirring blades may rub against the inner wall of the magnetic guide sleeve 54, and the magnetic foreign matter adsorbed on the inner wall of the magnetic guide sleeve 54 is pushed to move upwardly, and finally the magnetic foreign matter is pushed to the annular opening 532 of the collecting frame 53, and falls into the collecting frame 53 through the annular opening 532 for centralized collection, thus realizing separation of the magnetic foreign matter from other substances in the sintering slurry of the battery, ensuring that the separated sintering slurry of the battery may be directly discharged through the discharge port 32, facilitating rapid separation of the magnetic foreign matter in the sintering slurry of the lithium ion battery, effectively shortening a separation time of the magnetic foreign matter, and improving a separation rate of the magnetic foreign matter. The detachable connection between the upper cover 2 and the separating cylinder 3 and the detachable connection between the central rotating shaft of the sun gear 513 and the collecting frame 53 are more beneficial for disassembly of the collecting frame 53 inside the separating machine body, so that the collecting frame 53 may be conveniently disassembled after completing operation, thus being beneficial for centralized treatment of the separated magnetic foreign matter in the collecting frame 53.

Figure 2:
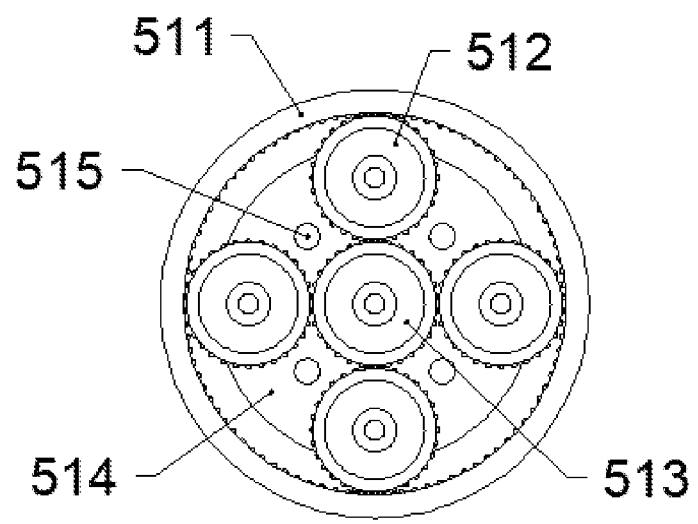
FIG. 2 is a schematic structural diagram of a bottom view of a planetary gear set according to the present disclosure.
Figure 3:
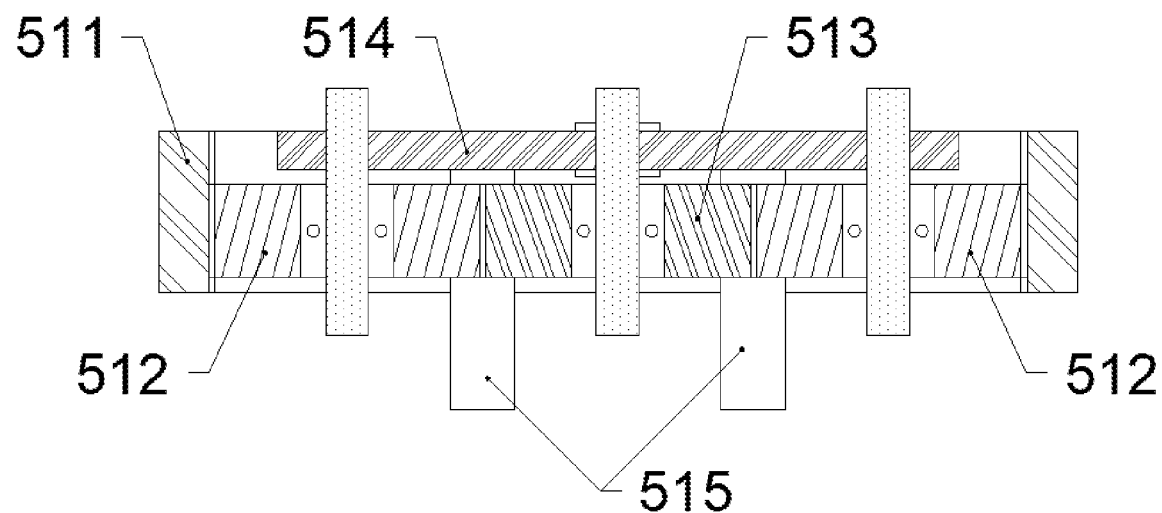
FIG. 3 is a schematic structural diagram of a cross section of the planetary gear set according to the present disclosure.

As shown in FIG. 2, in the embodiment, a size of the planetary gear 512 is equal to that of the sun gear 513. A gear ratio of the planetary gear 512 to the sun gear 513 determines revolution and rotation speeds of the planetary gear 512. When the sizes of the planetary gear and the sun gear are equal, the stirring shaft 52 may be ensured to have a sufficient stirring speed, thus ensuring that the magnetic foreign matter in the sintering slurry of the lithium ion battery may have a good separation rate during stirring. Moreover, when the size of the planetary gear 512 is equal to that of the sun gear 513, the stirring speed of the stirring shaft 52 and a precipitation rate of the magnetic foreign matter can be increased. Therefore, the planetary gear 512 and the sun gear 513 with an appropriate size ratio may be selected for use according to use requirements in actual use.

As shown in FIG. 1, in the embodiment, the outer side wall of each of the stirring shafts 52 includes at least three sets of stirring blades, and a number of blades of each set of stirring blades is no less than two. In the embodiment, surfaces of the stirring blades are all provided with rubber sleeves (not shown in the drawing). Four sets of stirring blades are preferably arranged on the outer side wall of each of the stirring shafts 52, and the number of blades each set of stirring blades is preferably three, which ensures that the stirring shaft 52 has sufficient stirring strength during rotation, thus ensuring full stirring of the sintering slurry of the lithium ion battery. Moreover, the rubber sleeves not only may be used as protective members for protecting the stirring blades, so as to reduce friction between the stirring blades and the inner wall of the magnetic guide sleeve 54 and reduce abrasion of the stirring blades, but also may improve a sealing performance between the stirring blades and the inner wall of the magnetic guide sleeve 54, so as to ensure that the magnetic foreign matter adsorbed on the inner wall of the magnetic guide sleeve 54 may be fully pushed into the collecting frame 53 for centralized collection.

Figure 4:
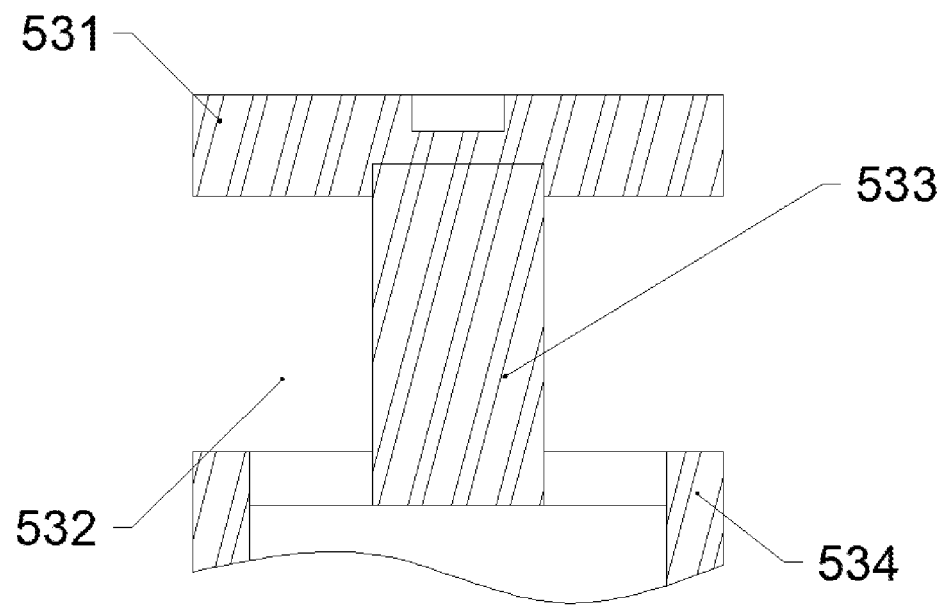
FIG. 4 is a schematic structural diagram of a local cross section of a collecting frame according to the present disclosure.
Figure 5:
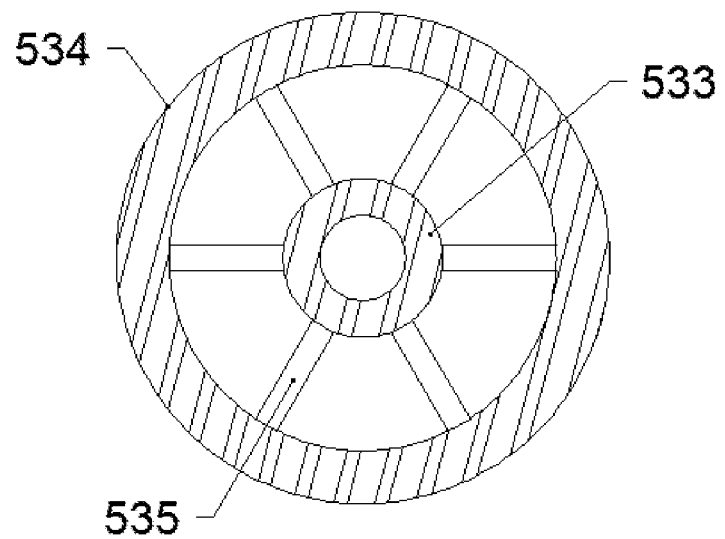
FIG. 5 is a schematic structural diagram of a top view of a lower cylinder of the collecting frame according to the present disclosure.

As shown in FIG. 4, in the embodiment, the collecting frame 53 includes an upper plate 531 and a lower cylinder 534 which are detachably connected. A connecting column 533 is fixed in a center of an opening of the lower cylinder 534 through a supporting rod 535, and the connecting column 533 extends upwardly along an arrangement direction of the lower cylinder 534. A top end of the connecting column 533 is in threaded connection with the upper plate 531, so that the annular opening 532 is formed between a bottom portion of the upper plate 531 and the opening of the lower cylinder 534. In the embodiment, the upper plate 531 is provided with, at a top end, a threaded groove movably connected with the central rotating shaft of the sun gear 513.

As shown in FIG. 1, in the embodiment, the balancing ring 55 is provided with balls at equal intervals on the outer side wall. When the other end of the stirring shaft 52 is contacted with the balancing ring 55, the stirring shaft is always contacted with the balls. The balancing ring 55 provided with the balls can not only ensure that the bottom portion of the stirring shaft 52 has certain support during rotation, but also improve a sliding effect of the stirring shaft 52 during rotation through the balls, thus ensuring that the stirring shaft 52 can revolve and rotate stably, and realizing full stirring of the sintering slurry of the lithium ion battery.

Figure 6:
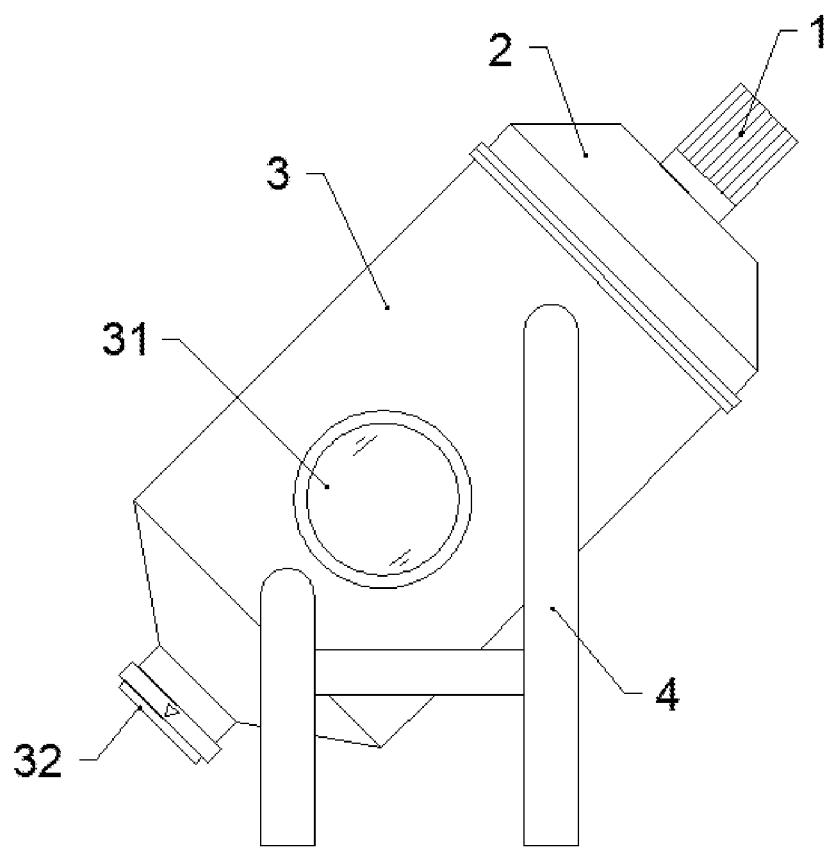
FIG. 6 is a schematic structural diagram of a front view of the present disclosure.

As shown in FIG. 6, in the embodiment, the separating cylinder 3 is provided with an observation window 31 for observing the inner cavity of the separating cylinder 3. The observation window 31 may facilitate an operator to observe the stirring of the sintering slurry of the lithium ion battery and the separation of the magnetic foreign matter inside the separating cylinder 3, thus being beneficial for the operator to control the operation of the whole device.

To sum up, according to the separating mechanism for the magnetic foreign matter in the sintering slurry of the lithium ion battery provided by the present disclosure, by using the stirring and separating mechanism 5 in a special structure, when the driving motor 1 drives the planetary gear set 51 to be operated, the stirring shaft 52 can be driven to revolve and rotate, the sintering slurry of the battery inside the separating cylinder 3 is fully stirred, and the sintering slurry of the battery is continuously pushed to the magnetic guide sleeve 54 through the stirring blades on the stirring shaft 52, so that the magnetic foreign matter doped in the sintering slurry of the battery is adsorbed on the inner wall of the magnetic guide sleeve 54. With the continuous rotation of the stirring shaft 52, the stirring blades rub against the inner wall of the magnetic guide sleeve 54, and the adsorbed magnetic foreign matter is pushed to move upwardly along the inner wall of the magnetic guide sleeve 54, and finally enters the collecting frame 53 for centralized collection, thus effectively realizing rapid separation of the magnetic foreign matter from other substances in the sintering slurry of the battery, shortening a separation time of the magnetic foreign matter, and improving a separation rate of the magnetic foreign matter.

In the descriptions of the specification, the descriptions with reference to the terms "one embodiment", "some embodiments", "example", "specific example" or "some examples", etc., refer to that specific features, structures, materials, or characteristics described with reference to the embodiments or examples are included in at least one embodiment or example of the present disclosure. In the specification, the schematic representation of the above terms should not be understood as necessarily referring to the same embodiment or example. Moreover, the specific features, structures, materials or characteristics described may be combined in any one or more embodiments or examples in a suitable manner. In addition, those skilled in the art may join and combine different embodiments or examples described in the specification.

Although the embodiments of the present disclosure have been shown and described above, it may be understood that the above embodiments are exemplary and cannot be understood as limiting the present disclosure, and those of ordinary skills in the art may make changes. modifications, substitutions and variations to the above embodiments within the scope of the present disclosure.

The invention claimed is:

1. A separating mechanism for a magnetic foreign matter in a sintering slurry of a lithium ion battery, comprising a separating machine body; the separating machine body comprising an upper cover (2) and a separating cylinder (3) which are detachably connected; the separating cylinder (3) being obliquely fixed through a bracket (4), and the separating cylinder (3) being provided with a discharge port (32) at a bottom end; wherein the upper cover (2) is provided with a driving motor (1) at a top end; a stirring and separating mechanism (5) is arranged in an inner cavity of the separating cylinder (3); an output shaft of the driving motor (1) extends into an inner cavity of the upper cover (2) and is connected with the stirring and separating mechanism (5); the stirring and separating mechanism (5) comprises a planetary gear set (51), a stirring shaft (52), a collecting frame (53), a magnetic guide sleeve (54) and a balancing ring (55); the planetary gear set (51) comprises a gear ring (511), planetary gears (512), a sun gear (513) and a connecting plate (514); the gear ring (511) is fixed in an inner wall on one side of the upper cover (2) close to the separating cylinder (3); the sun gear (513) is located at a central point of the gear ring (511), and a central rotating shaft of the sun gear (513) is connected with the output shaft of the driving motor (1) through a coupler; the planetary gears (512) are arranged at equal intervals between the sun gear (513) and the gear ring (511), and the planetary gears (512) are all meshed with the sun gear (513) and the gear ring (511); the connecting plate (514) is rotatably arranged on an outer side of the central rotating shaft above the sun gear (513), the connecting plate (514) is provided with a hole for a central rotating shaft of each of the planetary gears (512) to pass through, and the connecting plate (514) between two adjacent holes is provided with a connecting rod (515) at a bottom portion; the balancing ring (55) is fixed above the discharge port (32) at a bottom portion of the inner cavity of the separating cylinder (3); one end of the stirring shaft (52) is connected with a bottom portion of the central rotating shaft of each of the planetary gears (512) through a coupler, the other end of the stirring shaft (52) is contacted with an outer side wall of the balancing ring (55), and the stirring shaft (52) is provided with multiple sets of stirring blades at equal intervals on an outer side wall; the collecting frame (53) is located directly below the sun gear (513) and detachably connected with a bottom portion of the central rotating shaft of the sun gear (513), the collecting frame (53) and the stirring shaft (52) are parallel to each other, and the collecting frame (53) is provided with an annular opening (532) on an outer side wall; the magnetic guide sleeve (54) is spirally sleeved on an outer side of the stirring shaft (52), an upper end of an outer side wall of the magnetic guide sleeve (54) is fixedly connected with the bottom portion of the adjacent connecting rod (515), and a top end of the magnetic guide sleeve (54) extends to an inner side of the annular opening (532); and the multiple sets of stirring blades on the stirring shaft (52) are all contacted with an inner wall of the magnetic guide sleeve (54) on the outer side of the stirring shaft (52).

2. The separating mechanism for the magnetic foreign matter in the sintering slurry of the lithium ion battery according to claim 1, wherein the separating cylinder (3) is provided with an observation window (31) for observing the inner cavity of the separating cylinder (3).

3. The separating mechanism for the magnetic foreign matter in the sintering slurry of the lithium ion battery according to claim 2, wherein the collecting frame (53) comprises an upper plate (531) and a lower cylinder (534) which are detachably connected; a connecting column (533) is fixed in a center of an opening of the lower cylinder (534) through a supporting rod (535), and the connecting column (533) extends upwardly along an arrangement direction of the lower cylinder (534); and a top end of the connecting column (533) is in threaded connection with the upper plate (531), so that the annular opening (532) is formed between a bottom portion of the upper plate (531) and the opening of the lower cylinder (534).

4. The separating mechanism for the magnetic foreign matter in the sintering slurry of the lithium ion battery according to claim 3, wherein the upper plate (531) is provided with, at a top end, a threaded groove movably connected with the central rotating shaft of the sun gear (513).

5. The separating mechanism for the magnetic foreign matter in the sintering slurry of the lithium ion battery according to claim 2, wherein the magnetic guide sleeve (54) is provided with an electromagnet sheet on the inner wall, so that the magnetic guide sleeve (54) is capable of generating a magnetic force on the inner wall after being electrified.

6. The separating mechanism for the magnetic foreign matter in the sintering slurry of the lithium ion battery according to claim 2, wherein the balancing ring (55) is provided with balls at equal intervals on the outer side wall; and when the other end of the stirring shaft (52) is contacted with the balancing ring (55), the stirring shaft is always contacted with the balls.

7. The separating mechanism for the magnetic foreign matter in the sintering slurry of the lithium ion battery according to claim 1, wherein the planetary gears (512) are provided in no less than three; and the hole in the connecting plate (514), the stirring shaft (52) and the magnetic guide sleeve (54) are respectively provided in a number equal to the number of the planetary gears (512).

8. The separating mechanism for the magnetic foreign matter in the sintering slurry of the lithium ion battery according to claim 7, wherein a size of each of the planetary gears (512) is greater than or equal to that of the sun gear (513).

9. The separating mechanism for the magnetic foreign matter in the sintering slurry of the lithium ion battery according to claim 8, wherein the collecting frame (53) comprises an upper plate (531) and a lower cylinder (534) which are detachably connected; a connecting column (533) is fixed in a center of an opening of the lower cylinder (534) through a supporting rod (535), and the connecting column (533) extends upwardly along an arrangement direction of the lower cylinder (534); and a top end of the connecting column (533) is in threaded connection with the upper plate (531), so that the annular opening (532) is formed between a bottom portion of the upper plate (531) and the opening of the lower cylinder (534).

10. The separating mechanism for the magnetic foreign matter in the sintering slurry of the lithium ion battery according to claim 8, wherein the magnetic guide sleeve (54) is provided with an electromagnet sheet on the inner wall, so that the magnetic guide sleeve (54) is capable of generating a magnetic force on the inner wall after being electrified.

11. The separating mechanism for the magnetic foreign matter in the sintering slurry of the lithium ion battery according to claim 8, wherein the balancing ring (55) is provided with balls at equal intervals on the outer side wall; and when the other end of the stirring shaft (52) is contacted with the balancing ring (55), the stirring shaft is always contacted with the balls.

12. The separating mechanism for the magnetic foreign matter in the sintering slurry of the lithium ion battery according to claim 7, wherein the outer side wall of each of the stirring shafts (52) comprises at least three sets of stirring blades, and a number of blades of each set of stirring blades is no less than two.

13. The separating mechanism for the magnetic foreign matter in the sintering slurry of the lithium ion battery according to claim 12, wherein surfaces of the stirring blades are all provided with rubber sleeves.

14. The separating mechanism for the magnetic foreign matter in the sintering slurry of the lithium ion battery according to claim 7, wherein the collecting frame (53) comprises an upper plate (531) and a lower cylinder (534) which are detachably connected; a connecting column (533) is fixed in a center of an opening of the lower cylinder (534) through a supporting rod (535), and the connecting column (533) extends upwardly along an arrangement direction of the lower cylinder (534); and a top end of the connecting column (533) is in threaded connection with the upper plate (531), so that the annular opening (532) is formed between a bottom portion of the upper plate (531) and the opening of the lower cylinder (534).

15. The separating mechanism for the magnetic foreign matter in the sintering slurry of the lithium ion battery according to claim 7, wherein the magnetic guide sleeve (54) is provided with an electromagnet sheet on the inner wall, so that the magnetic guide sleeve (54) is capable of generating a magnetic force on the inner wall after being electrified.

16. The separating mechanism for the magnetic foreign matter in the sintering slurry of the lithium ion battery according to claim 7, wherein the balancing ring (55) is provided with balls at equal intervals on the outer side wall; and when the other end of the stirring shaft (52) is contacted with the balancing ring (55), the stirring shaft is always contacted with the balls.

17. The separating mechanism for the magnetic foreign matter in the sintering slurry of the lithium ion battery according to claim 1, wherein the collecting frame (53) comprises an upper plate (531) and a lower cylinder (534) which are detachably connected; a connecting column (533) is fixed in a center of an opening of the lower cylinder (534) through a supporting rod (535), and the connecting column (533) extends upwardly along an arrangement direction of the lower cylinder (534); and a top end of the connecting column (533) is in threaded connection with the upper plate (531), so that the annular opening (532) is formed between a bottom portion of the upper plate (531) and the opening of the lower cylinder (534).

18. The separating mechanism for the magnetic foreign matter in the sintering slurry of the lithium ion battery according to claim 17, wherein the upper plate (531) is provided with, at a top end, a threaded groove movably connected with the central rotating shaft of the sun gear (513).

19. The separating mechanism for the magnetic foreign matter in the sintering slurry of the lithium ion battery according to claim 1, wherein the magnetic guide sleeve (54) is provided with an electromagnet sheet on the inner wall, so that the magnetic guide sleeve (54) is capable of generating a magnetic force on the inner wall after being electrified.

20. The separating mechanism for the magnetic foreign matter in the sintering slurry of the lithium ion battery according to claim 1, wherein the balancing ring (55) is provided with balls at equal intervals on the outer side wall; and when the other end of the stirring shaft (52) is contacted with the balancing ring (55), the stirring shaft is always contacted with the balls.

\* \* \* \* \*